June 18, 1957 A. J. ANNIS 2,795,971
POWER TRANSMISSION
Filed Aug. 1, 1955 4 Sheets-Sheet 1
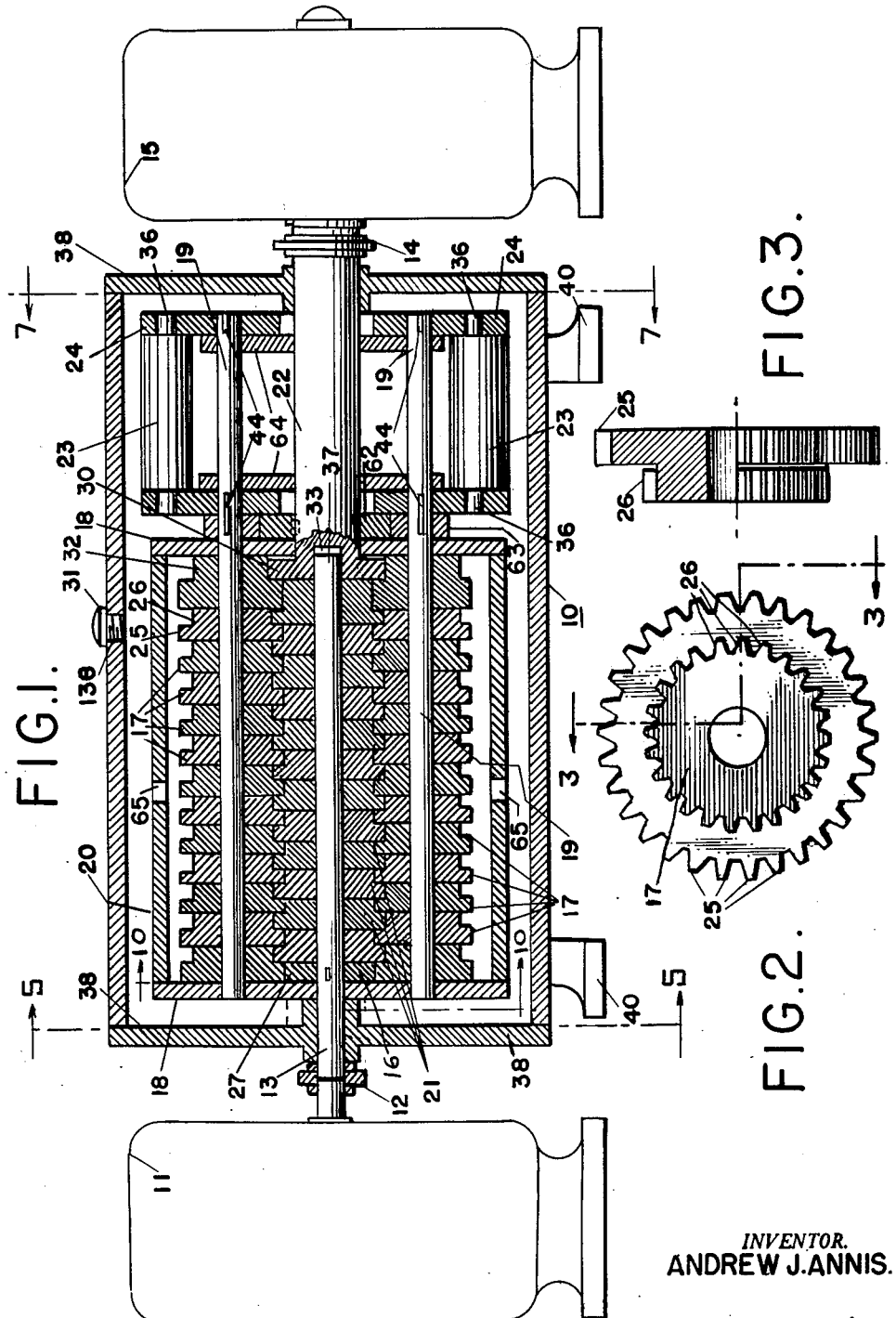
INVENTOR.
ANDREW J. ANNIS.
BY Howard J. Whelan
ATTORNEY.

June 18, 1957  A. J. ANNIS  2,795,971
POWER TRANSMISSION
Filed Aug. 1, 1955  4 Sheets-Sheet 2
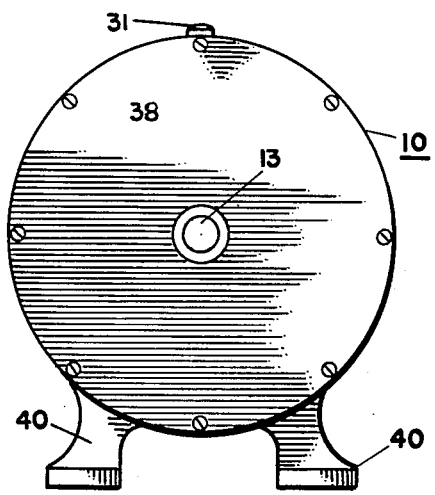
FIG. 4.
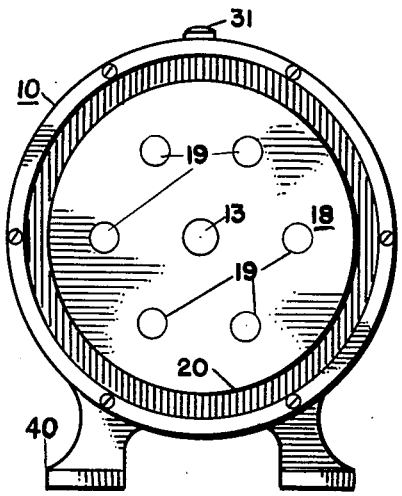
FIG. 5.
FIG. 6.
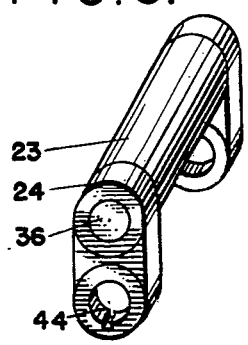
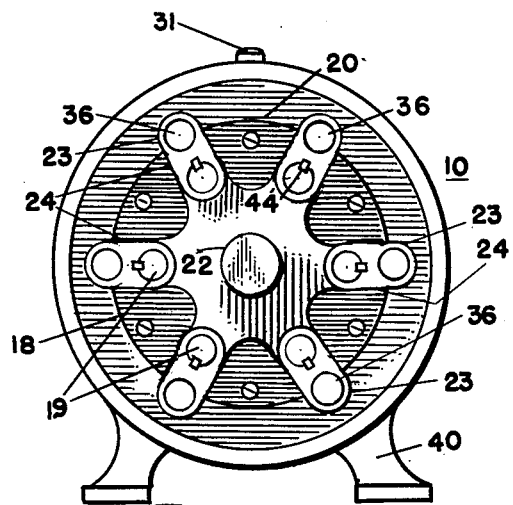
FIG. 7.
*INVENTOR.*
ANDREW J. ANNIS.
BY Howard J. Whelan
ATTORNEY.

June 18, 1957 A. J. ANNIS 2,795,971
POWER TRANSMISSION
Filed Aug. 1, 1955 4 Sheets-Sheet 3

Inventor
ANDREW J. ANNIS

By *Howard J. Whelan.*

Attorney

INVENTOR.
ANDREW J. ANNIS.

BY Howard J. Whelan
ATTORNEY.

United States Patent Office
2,795,971
Patented June 18, 1957

2,795,971

POWER TRANSMISSION

Andrew J. Annis, Fort Lauderdale, Fla.

Application August 1, 1955, Serial No. 525,670

6 Claims. (Cl. 74—752)

This invention refers to the mechanism employed for the coupling of a driving unit to a driven device and more particularly to one adapted to modify the operation of the latter and especially in its adaption of power to meet sudden exigencies.

There are many types of transmissions, the majority of which serve as a medium for changing the speed provided by the driver unit to a greater or lesser speed, of the driven device. In this invention the difference in change of speed, is made less important between the driver unit and the driven device, although it can be accomplished, since more emphasis is laid on the development of energy within its transmission to take care of special requirements. This is accomplished by including a series of counterpoises that store energy and release it as required, in the operation of the equipment.

The invention includes in its objects the provision of a new and improved power transmission unit that will avoid one or more of the disadvantages and limitations of the prior art.

Another object of the invention is to provide a new and improved power transmission unit that will be capable of absorbing considerable energy from a driving device during its normal operation and on occasion to reinforce its action to overcome excessive requirement or loads when they are applied to the driven device and thereby keep the apparatus relatively uniform and effective in its performance.

A further object of this invention is to provide a new and improved form of power transmission unit including plural items of similar design and a balanced arrangement to provide smooth and potent operation.

An additional object of the invention is to provide a new and improved power transmission unit including a mechanism of gears meshed in an unusual arrangement in conjunction with counterpoises all working about a common axis and employing centrifugal and gyroscopic principles to effect the desired operation.

Other objects of the invention will become apparent as its details are further explained.

For a better understanding of the invention and its objects reference is made to the accompanying drawings wherein a particular form of the invention is indicated by way of example. These drawings are explained in the following description that outlines the construction in detail and the manner in which the components operate.

Referring to the drawings:

Figure 1 is a longitudinal sectional view through a transmission unit embodying this invention, the driving and driven devices being indicated in lighter outlines;

Figure 2 is a side elevation of a dual gear used in this invention;

Figure 3 is an end view of Figure 2 partly in section taken along line 3—3 of Figure 2;

Figure 4 is an end elevation of the unit looking from the driving end;

Figure 5 is an end elevation of the unit with the end plate of the main housing removed and looking in the direction of arrows 5—5 of Figure 1;

Figure 6 is a detail in perspective of a counterpoise and its supporting links, used in this embodiment;

Figure 7 is an end elevation of the unit with its outer end plate removed and looking in the direction of arrows 7—7 of Figure 1, when the plant is running out full speed in either direction;

Similar reference numerals are employed to designate the similar parts throughout the drawings.

Figure 8:
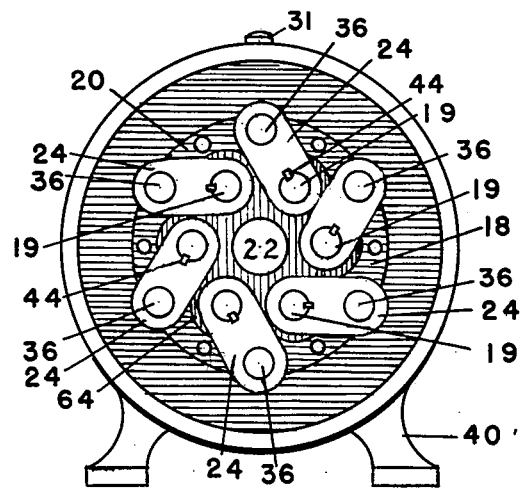
Figure 8 is an end elevation similar to Figure 7, except that it shows the counterpoises turned counterclockwise the maximum distance, and with the shafts 22 and 13, turning clockwise, this causes the complete assembly to turn as one unit.
Figure 9:
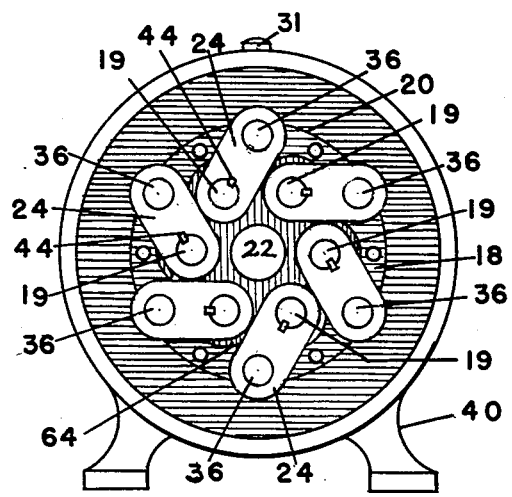
Figure 9 is similar to Figure 8, except that the shafts 22 and 13 are shown turning counterclockwise, the links and counterpoises have turned the maximum distance in clockwise direction.
Figure 11:
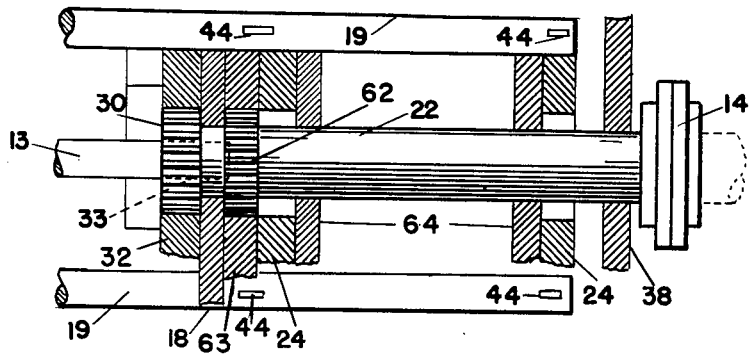
Figure 11 is a side elevation of the driven shaft of the unit with its incidental mechanisms shown in section.
Figure 10:
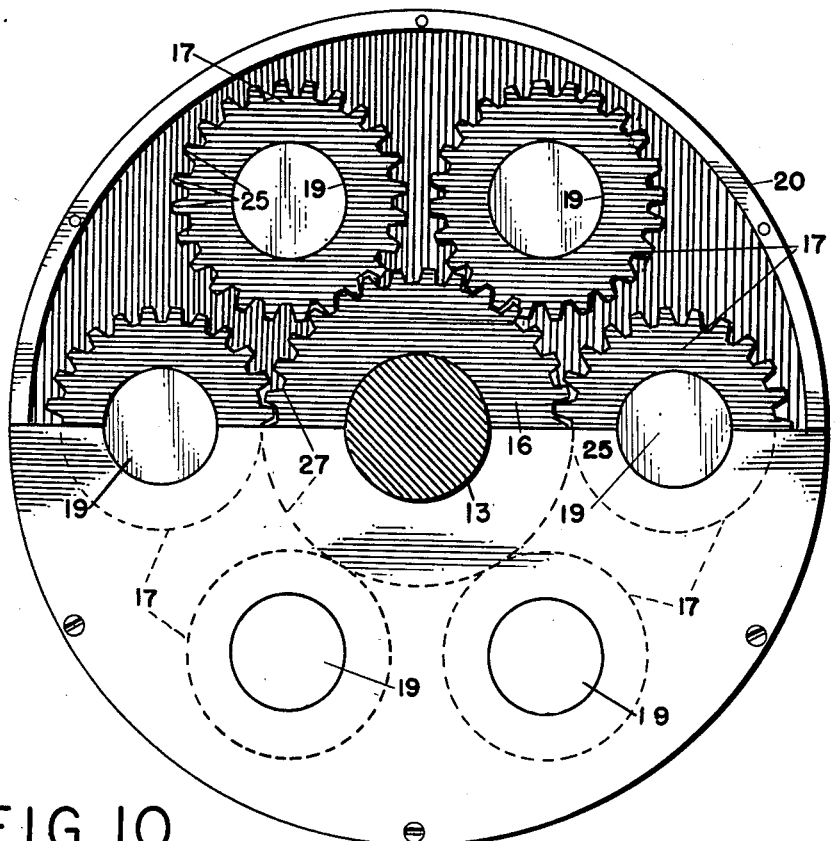
Figure 10 is an end elevation partly in section and looking in the direction of arrows 10—10 of Figure 1.

In the construction indicated in the drawings, a transmission power unit consists of an external housing 10, in which the working components are contained and operate. A motor 11 of any conventional type, such as electrical, internal combustion, pneumatic, hydraulic or otherwise is connected through a coupling 12 to the driving shaft 13 that initiates the mechanical movements of the transmission, from the driving end. At the driven end another coupling 14 connects with a generator or other suitable working device 15 using the power transmitted to it from the motor.

The components of the transmission are in four principal groups. One group includes the main driving shaft 13, on which a main operating or driving gear 16 is keyed. Another group consists of sets of six dual-geared planetary gears 17 mounted on shafts 19 arranged in end plates 18. The end plates 18 also serve to close the ends of a cylindrical enclosure 20. The enclosure 20 and end plates 18 form a casing that is free to revolve on the shaft 13, carrying the shafts 19 and dual gears 17 in a train containing as many sets of gears as may be determined desirable with it. The shaft 13 rotates at the same number of revolutions per minute as the motor shaft and coupling 12, and being keyed to the gear 16 rotates the latter at the same speed. The shafts 19 are kept localized in the end plates 18 and the spider rings 64, but the sets of planetary gears 17 are loose and revolve freely on shafts 19. This gives the gears 17 two motions, one rotating on their own central shafts 19 and another moving bodily around on the axis of shaft 13. The next or third group and components are sets of dual geared idler gears 21 in train similar to gears 17 and rotate freely on the main shaft 13 and are meshed with the gears 17. The unique manner in which the gears mesh will be outlined in more detail in another paragraph of the specification. The next or fourth group of components for the counterpoise mechanism has a relatively large driven shaft 22 with its axis aligned with that of the shaft 13. It has a cylindrical recess 33 in it to support the end 37 of shaft 13 and forms a bearing for it. On the driven shaft 22 are six sets of aerial counterpoises 23 supported by links 24 oscillatable on shafts 19, extended through the spider frames 18 to and into the section of the outer housing 10 adjacent the driven device 15. The extended shafts 19 are aligned with the portions within the enclosure 20, but instead of allowing free turning of the items on it, such as exists for the gears 17, they are keyed to the links 24 at 44.

Explaining the structural items of the first group, which is being arbitrarily termed the driving group, the main driving gear 16 is keyed to the shaft 13 and meshes with six gears 17 evenly and peripherally spaced around it. Thus the one main gear 16 rotates the six gears 17 in a planetary manner through a concentric path. The main gear 16 is kept permanently located and affixed on its shaft 13, but the planetary gears 17 are not affixed on the shafts 19 and will be referred to in a later paragraph in this description.

The gears 17 have dual geared sets of stepped gear teeth 25 and 26 of large and small diametral pitch respectively. The set of teeth 25 are in mesh with the teeth 27 of the gear 16, and are propelled by the latter while the other set of small diametral pitch teeth 26 engage the larger diametral pitch teeth of stepped or dual idler gears 21 running freely on the shaft 13 next to and in train on the gear 16. The other set of short diametral pitch teeth 61 meshed with teeth 25 of the stepped and dual toothed gear 17 laterally touching it. The short diametral pitch teeth 26 of the latter gear mesh with the large diametral pitch teeth of the laterally adjacent idler gear 21 and drives them. All the succeeding gear 17 are similar to the original gear 17; and the idlers 21 succeeding like the original gear 21, have their teeth engaged in the manner previously noted and follow through in a train aggregation for the length of the enclosure 20. The last of these gears 17 and 21 transmit their power to an intermediate gear 32 on the shaft 19, that in turn meshes with a thrust gear 30 keyed on or made integral with the driven shaft 22. The shaft 22 is aligned with the shaft 13 and extends through the housing 10 to the driven coupling 14. The shaft 13 rotates free of shaft 22.

All of the shafts run in suitable bearings which may be plain ball bearings in the walls of the enclosure 20, housing, and otherwise as and where needed, even if not indicated in the drawings. The counterpoises 23 have their links 24 keyed on the shafts 19 in their bearings while the stubs 36 at the axis of the counterpoises 23 roll in bearings in their free end portions of the links. The links cannot rotate because of the limitations in swing caused by the positions of the neighbor counterpoise mechanisms.

The housing 10 consists of a casing designed to enclose the enclosure 20 and counterpoise mechanism, and plates 38 being bolted on or held by screws in a conventional way to make it oil tight. The bearings for the driving and driven shafts are preferably gasketed to prevent leakage where the shafts 13 and 22 pass through the end plates 38. The housing 10 and enclosure 20 are normally filled with a suitable oil (not shown) to keep the gears and other moving parts well lubricated and cooled. A plug 31 closes a hole 138 in the housing 10 for the oil to be poured in or drained out. The housing is built with extending feet 40 to enable it to be mounted on a suitable foundation and preferably bolted down.

Since the type of motor 11 and driven device 15 can be of various designs and capabilities, the forms shown in the drawings are arbitrarily selected to represent such diagrammatically without any particular limit being intended in their structures to be used for any special case.

The operation of the device is unique. The motor 11 of a rotating type is started and through the coupling 12 rotates the shaft 13. The shaft 13 being keyed to the main operating and driving gear 16 revolves it and rotates the six sets of planetary dual gears 17 engaging with their teeth 25 on their large diametral pitch with the teeth 27 of the gear 16. The dual gears 17 have their teeth 26 on their smaller diametral pitch meshed with the teeth on the larger diametral pitch of the dual idler 21 and revolve the latter. The teeth of small diametral pitch of the first idler 21 in turn transfer their rotation to the laterally succeeding planetary gear 17 and the latter in turn rotates the laterally succeeding idler gear 21. This action continues similarly through the succeeding planetary gears 17 and idlers 21 until the last one 32 in the train is reached and the thrust gear 30 on the driving shaft 22 is activated. The gear 62 is keyed on the driven shaft 22 and drives six spinner gears 63 keyed on the shafts 19 and rotate the enclosure 20 and its gears and shafts enclosed therein. A spider frame 64 is mounted and supported on driven shaft 22. The links 24 are supported by and keyed on shafts 19 as shown in the drawings. Oil holes 65 are provided in enclosure 20 to allow oil to pass in and out of the enclosure. In these operations the transmission of power through the train requires a certain amount of time before it reaches the gear 30 and the shaft 22 keyed or affixed to the latter. Further any exceptional resistance to the rotary movement turns the gear 62 that turns gears 63 that turns shafts 19. The links and counterpoises are turned by shafts 19. Shafts 19 turn the gear casing 20 and its end plates 18. This operation changes the position of the counterpoises and links. The centrifugal force of the counterpoises bring the counterpoises to the position they were before the resistance took place.

When gear 30 is rotated, it turns shaft 22 with it. Shaft 22 turns 62 gear, that turns gears 63, that is keyed onto shafts 19, that turn links 24. They are keyed onto shafts 19 that turn the counterpoises. The axis of the links is shaft 19, and shaft 19 turns in the bearings of the spider ring. As the links swing out easily through a limited arc their rotative motion produces a centrifugal action that makes the counterpoises fly outwardly and accumulate momentum on the shafts 19. Any opposition existing in the counterpoises at the beginning of the operation tends to act through the mechanisms and induce a planetary motion in the gears 17 on the plates 18 and idlers 21 until overcome. This is eliminated as the driving and driven elements reach their normal running speed. If the driver device increases its speed, for any reason, it has a tendency to produce a positive planetary movement of the gears 17 and end plates 18 supporting them. If slowed up the movement will be negative in relation to the latter.

The action of the counterpoise and planetary mechanisms together or by themselves is to provide a balancing of the power transmission that is very elastic. It eliminates undue stresses on the gear teeth and the components of the driving and driven devices. Sudden loads of a temporary nature are met readily and absorbed without apparent distress and when removed the transmission adapts itself to normal operation quickly and effectively.

The components of the transmission unit are simple, using those of the same design, size and capacity thereby offering flexible interchangement when needed or desirable. Various changes in ratio can be provided by varying the pitch diameters and number of the teeth, or leaving them to make such 1:1. In the present construction, the pitch diameter of gears 16, and the small pitch diameters of gears 17, 21, 32 are preferably of the same size and strength to meet the requirements of the job to be done. The pitch diameters of the larger pitch diameters of gears 17, 21, 30 and 32 are preferably of the same diameter and tooth strength. These mechanisms act somewhat like a fly-wheel but not with its momentum stable.

The momentum changes as the rotation of the counterpoises increases and centrifugal force becomes greater. Likewise when the load on the driven device becomes heavier and transmission shows up to give up the stored energy in the counterpoise mechanism and the other rotating components of the transmission unit. The adjustment in each instance is relatively gradual and therefore creates no great stresses suddenly.

In this device one force is applied in one direction and the opposing force is applied in the opposite direction. This equal and opposite force is not held by the frame of the transmission, but is held and controlled by the counterpoises.

While but one general form of the invention is shown in the drawings and described in the specification, it is not desired to limit this application for patent to this particular form as it is appreciated that other forms of construction could be made that would use the same principles and come within the scope of the appended claims.

Having thus described the invention, what is claimed is:

1. A transmission unit comprising in combination, a main driving shaft including a coupling for connecting it to a motor extraneous thereto, main driving gear fastened to the shaft and rotatable therewith, bearings for the shaft, a series of spaced gears meshed in planetary form with said main gear and rotatable in a plane peripheral thereto, shafts for carrying said spaced gears, planetary frame for supporting said last mentioned shafts, a series of idlers rotable freely on the main driving shaft and disposed in lateral sequence thereon and meshed with said planetary gears for transmitting power from the main gear through the said gears to the idler last in line of said sequence, a driven shaft aligned and parallel with the main gear shaft and including a gear fastened thereon meshed with the said last in line idler gear for delivering power to the driven shaft, a spider frame supported by driven shaft, spaced links keyed on said spaced gear shafts and arranged to hingedly oscillate through a predetermined arcuate travel concentric with the driven shaft, counterpoises secured to the links and adapted to fly out from said driven shaft and centrifugally vary their positions in regard thereto according to the rate of revolving of said driven shaft, a pair of end plates secured to the frames supporting the planetary gears and together forming a casing for enclosing the planetary gears, idlers and main gear with their respective shafts, and an outer housing for enclosing the casing, the links and counterpoises, and coupling means attached to the driven shaft for delivering power therefrom to an extraneous driven power device.

2. A transmission unit of the type set forth in claim 1, and oil means in said casing and housing for lubricating said gears, shafts, links and counterpoises.

3. A transmission unit of the type set forth in claim 2, wherein said couplings being disposed exterior to the housing, said planetary gears being of uniform size and type; said idlers being of uniform size and type and mounted on a common shaft with their faces in close lateral proximity with each other.

4. A transmission unit of the type set forth in claim 3, wherein the planetary gears and idlers being paired to mesh with each other in a continuous train and transmitting power between the driving ends of the shafts to the driven ends.

5. A transmission unit of the type set forth in claim 4 wherein the links and counterpoises being located outside of the casing but within the housing and rotated by the driven shaft actuated by said gears, with the oil means in continuous contact with the exterior surfaces thereof.

6. A transmission unit of the type set forth in claim 5, wherein said axis of the driving, driven, of the extraneous power devices, and the shafts supporting the main gear idlers and linked counterpoises being in line.

References Cited in the file of this patent
UNITED STATES PATENTS

| 1,812,176 | Sheridan | June 30, 1931 |
| 2,564,211 | O'Hara | Aug. 14, 1951 |
| 2,625,841 | Lewis | Jan. 20, 1953 |